United States Patent
Klug et al.

[11] Patent Number: 5,226,152
[45] Date of Patent: Jul. 6, 1993

[54] FUNCTIONAL LOCKSTEP ARRANGEMENT FOR REDUNDANT PROCESSORS

[75] Inventors: Keith M. Klug, Mesa; Steven R. Tugenberg, Scottsdale, both of Ariz.

[73] Assignee: Motorola, Inc., Schaumburg, Ill.

[21] Appl. No.: 623,843

[22] Filed: Dec. 7, 1990

[51] Int. Cl.⁵ .............................................. G06F 11/00
[52] U.S. Cl. .................................. 395/575; 364/269; 364/269.1; 364/270.7; 371/36; 371/68.3
[58] Field of Search ................ 371/68.3, 36; 364/269, 364/269.1, 270.7; 375/575

[56] References Cited

U.S. PATENT DOCUMENTS

| | | | |
|---|---|---|---|
| 3,681,578 | 8/1972 | Stevens | 371/36 |
| 3,810,119 | 5/1974 | Zieve et al. | 371/68.3 |
| 4,517,673 | 5/1985 | Brown et al. | 371/36 |
| 4,616,312 | 10/1986 | Uebel | 371/36 |
| 4,907,232 | 3/1990 | Harper et al. | 371/36 |
| 4,937,741 | 6/1990 | Harper et al. | 364/200 |
| 4,945,486 | 7/1990 | Nitschke et al. | 371/68.3 |

Primary Examiner—Charles E. Atkinson
Attorney, Agent, or Firm—Frank J. Bogacz

[57] ABSTRACT

N redundant processors operating in functional lockstep synchronization for maintaining system integrity. Comparison and synchronization logic are connected between N processors in redundant configuration and peripheral devices. The comparison and synchronization logic act to insure that the redundant processors are performing the same read/write operations. Calculation or processing not requiring access to peripherals may take place in an asynchronous manner. Processors are halted from performing further operations until all appropriate read or write operations are synchronized. The processors are then allowed to proceed. An overall watchdog timer provides for detecting an error condition for non-responsive or lead responding processors.

19 Claims, 2 Drawing Sheets

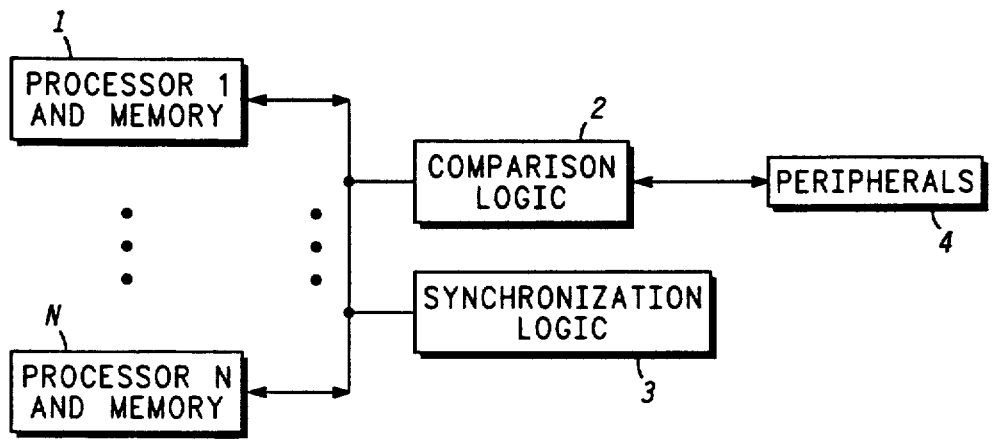
FIG. 1
FIG. 2
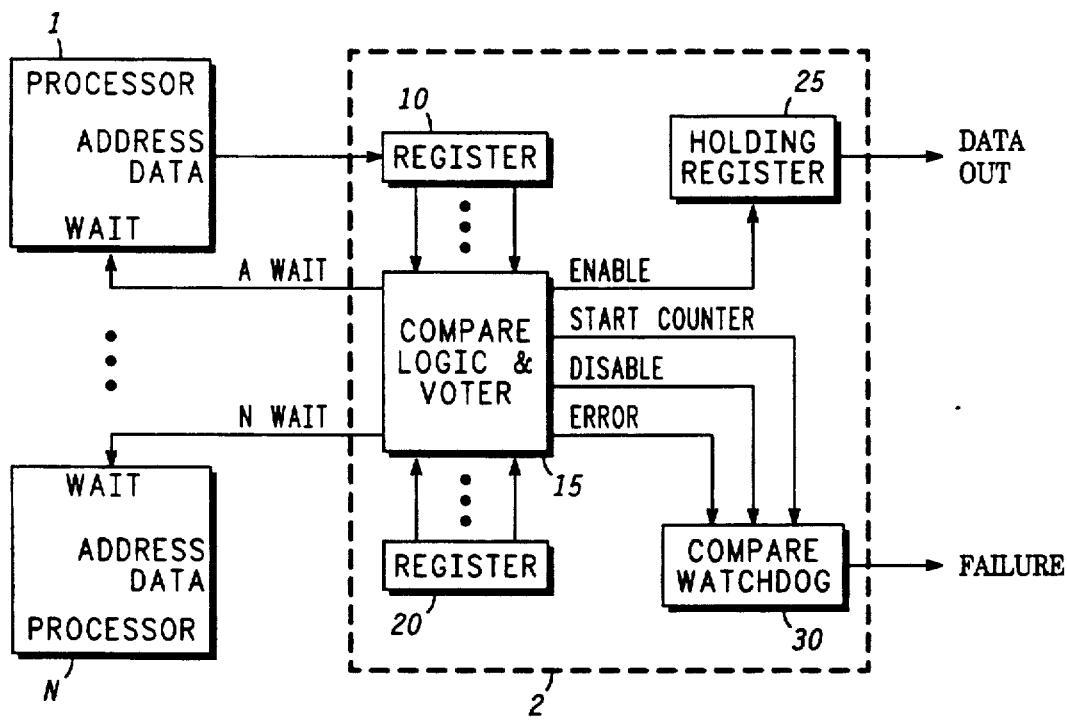
FIG. 5
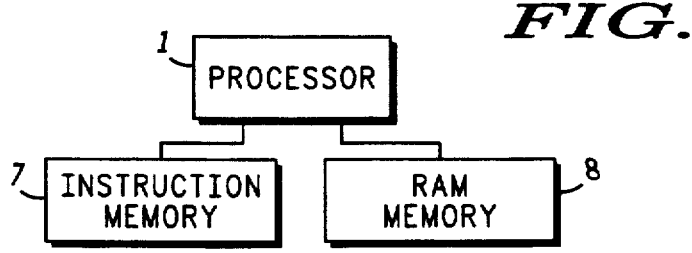

FUNCTIONAL LOCKSTEP ARRANGEMENT FOR REDUNDANT PROCESSORS

BACKGROUND OF THE INVENTION

The present invention pertains to redundant processor systems and more particularly to a functional lockstep arrangement for redundant processors in real-time processing applications.

Processor systems used for critical real-time processing applications have inherent problems in determining when a hardware failure has occurred and taking subsequent corrective action. One method of detecting such failures and maintaining consistent operation is to use redundant processors with synchronous processing. In such situations, the processors each perform the same exact instruction at the same time. This is called clock lockstep processing. Usually a third processor monitors the operation of the redundant processors by comparing the inputs and outputs of the processors. If a mismatch of the inputs or the outputs of the processors is detected, the third processor determines which of the two processors is operating properly and disconnects the other processor.

The redundant lockstep implementation has several drawbacks. First, increasing microprocessor throughput requires an increase in the processor's clock speed. With increasing clock speeds and processor complexity, clock lockstep is very difficult to achieve and maintain. For example, even when processors are in a known condition such as a reset, maintaining clock lockstep is very difficult. The setup and hold times for synchronous reset signals become narrower as clock speeds are increased. As a result, the circuitry needed to meet setup and hold time conditions becomes more complex and expensive.

Second, asynchronous inputs to a redundant processors will generally fail in the clock lockstep mode. Whenever asynchronous signals are sampled, there are times when the input signal will change during the sampling time. When this occurs, there is a probability that the input signals change may not be seen by one of the processors. Further, when the input signal causes a processor interrupt to occur, it would be possible for one processor to respond to the interrupt and start execution of an interrupt service routine while the second processor would not see the interrupt until one clock cycle later. Hence, the two processors will not remain in clock lockstep although there is not a hardware fault.

Third, internal processor states cannot always be guaranteed to be the same even though redundant processors are executing the same instruction. The internal processor states are especially hard to predict after the processors have undergone a reset or initialization process. Hence, it may be difficult or impossible to insure clock lockstep in such situations.

Accordingly, it is an object of the present invention to provide a functional lockstep processor arrangement.

SUMMARY OF THE INVENTION

According to the present invention, a novel functional lockstep apparatus for redundant processors is shown.

A function lockstep arrangement simultaneously operates a plurality of N redundant processors. The functional lockstep arrangement includes a first plurality of redundant processors and a peripheral devices. Control logic is also included which is coupled between the plurality of redundant processors and the peripheral devices. The control logic asynchronously requests by the plurality of redundant processors for access to the peripheral devices. The control logic determines that the requests of the processor means are substantially identical and permits access to the peripheral devices.

The above and other objects, features, and advantages of the present invention will be better understood from the following detailed description taken in conjunction with the accompanying drawings.

BRIEF DESCRIPTION OF THE DRAWING

FIG. 1 is a block diagram of the functional lockstep arrangement for redundant processors in accordance with the present invention.

FIG. 2 is a block diagram of the comparison logic of FIG. 1.

FIG. 5 is a block diagram of the processor and memory system shown in FIG. 1.

DESCRIPTION OF THE PREFERRED EMBODIMENT

Figure 3:
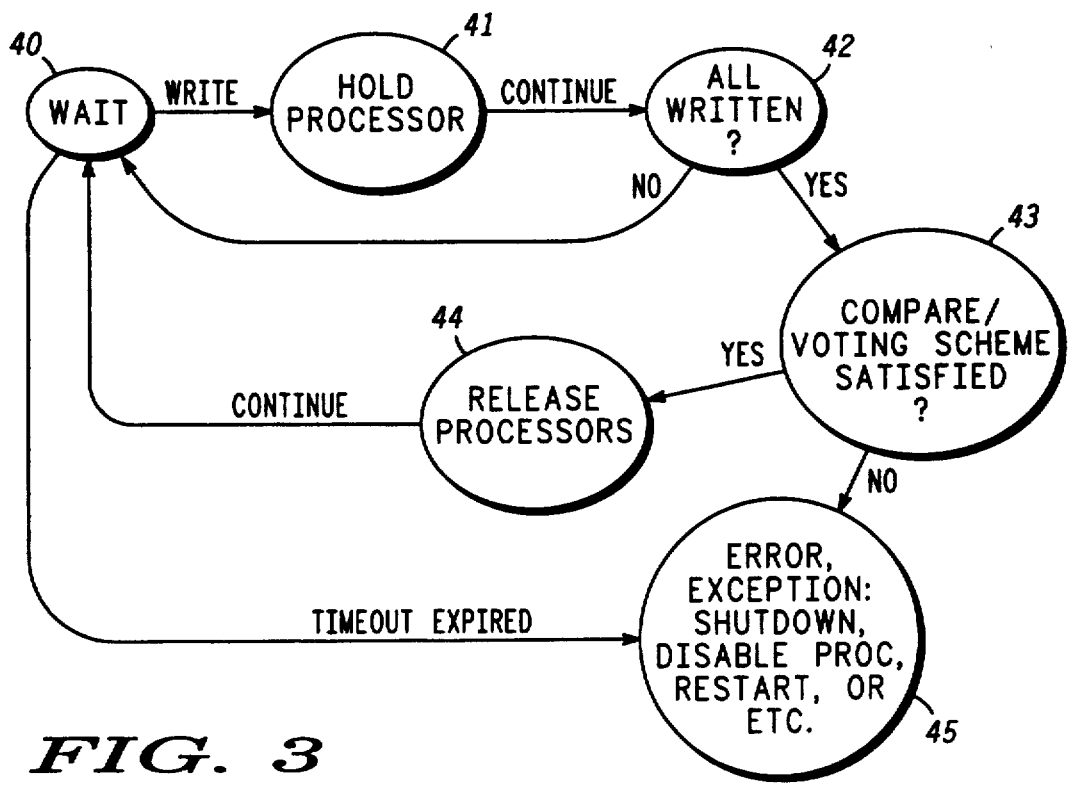
FIG. 3 is a flow diagram of the functional lockstep write operation flow.

Referring to FIG. 1, a block diagram of a functional lockstep arrangement for redundant processors is shown. Processors 1 through N and their associated memory are shown in FIG. 1. The number of processors included in the functional lockstep redundant processor arrangement may include two or more processors. This functional lockstep arrangement is particularly suited to microprocessor implementations. Microprocessors such as the Motorola 56000 family, Motorola 68000 family, Motorola 88000 family, or various other processors such as the Intel 286 or 386 family of processors may be employed in this arrangement. In addition to these processors which have built-in cycle stretching capabilities, a static processor could also be used by adding additional circuitry to gate the clock input signal. Further, since the present invention is a functional lockstep arrangement, the processors may be mixed in kind. That is, a Motorola 68030 may be run in functional lockstep with a 286-type processor.

Each processor and memory 1 through N may be implemented as shown in FIG. 5. FIG. 5 shows processor 1, for example, connected to an instruction memory 7 and to a RAM (scratch pad) memory 8. Instruction memory 7 provides microprocessor 1 with the instructions which it is to execute for performing the overall processor functions. Instruction memory 7 is typically a read-only-type memory so that instructions may not be inadvertently destroyed. RAM memory 8 is a scratch pad memory in which processor 1 keeps transient data and performs any calculations required of it. RAM memory 8 is typically a read/write memory under the control of processor 1.

Returning again to FIG. 1, processors 1 through N are shown connected to comparison logic 2 and to synchronization logic 3. Comparison logic 2 and synchronization logic 3 provide for the functional lockstep arrangement. Comparison logic 2 is further connected to the input and output peripherals 4.

The redundant processors 1 through N and their associated memories are configured as if they were stand-alone processors. The instruction memories 7 need not necessarily have the identical program instructions, however, results from the processors must be written to common peripherals in the same order. The comparison logic 2 and synchronization logic 3 cooperate to compare the outputs of the N processors to verify proper synchronous operation. Comparison logic 2 provides a signal to synchronization logic 3 which is used by synchronization logic 3 to functionally synchronize the N processors and to halt any or all of the N processors upon detection of a miscomparison, as required.

Referring to FIG. 2, a block diagram of the comparison logic of FIG. 1 is shown. Each of the N processors is connected to a corresponding register. For example, processor 1 is connected to register 10. Processor N is connected to register 20, etc. Each of the registers 10, 20, etc. is connected to compare logic 15. The compare logic 15 is connected to each of the processors by wait lead. The A space wait lead is connected to processor 1, the N space wait lead is connected to processor N, etc. Register 10 is connected to holding register 25 which stores the data to be output. Compare logic 15 is connected to compare watchdog 30 via the start counter lead and the error lead. A failure signal is generated on the corresponding lead for a watchdog time-out.

For each write operation which is to be compared, each processor 1 through N writes the output into an appropriate register 10, 20, etc. The processor's data and address is held in holding register 25 until the comparison of the processors' output is verified. The advantage of sending the data to a holding register until a valid comparison is made is to prevent any data that miscompares from being written to a peripheral or any other destination.

When the compare logic 15 detects a write operation from any of the processors (1 through N), compare logic 15 asserts the appropriate wait signal via the corresponding lead to that processor to suspend its bus cycle and hold that processor's operation. As the remaining processors perform a similar write to their appropriate registers 10, 20, etc., their wait signal is also asserted via the corresponding lead. When all of the N processors have written into their appropriate registers, compare logic 15 checks the contents of each of the processor's registers. If the contents of the registers match, the signal on the corresponding wait lead is negated or removed and the processors are allowed to continue processing. Instead of a all match-type comparison, a voting scheme may be instituted. Such voting schemes may include an M of N processor match situation. For example, a two-of-three processor match may be considered a valid match under a voting scheme.

If all the outputs fail to compare (or M of N fail to compare in a voting scheme), or if any of the N processors do not write all the data within a predetermined amount of time (a watchdog timer is set at the beginning of the process), a failure condition is indicated on the corresponding lead. The system may then take appropriate action to reconfigure or remove faulty processor from their on-line activity. These system actions could also include indefinitely holding the processors until the system is reset. Once it has been determined by compare logic 15 that a match exists, the enable signal is sent via the corresponding lead to holding register 25. Holding register 25 then transfers the data to the appropriate peripheral device.

When the first processor wrote its data into the corresponding register, compare logic 15 also started the watchdog timer via the start counter lead. This enables the compare watchdog logic 30 to begin overall timing of the processor's write operation. This overall timing is sufficient for each of the processors to respond before the watchdog interval expires. If the watchdog interval expires before each of the processors has responded, the failure signal is generated on the corresponding lead. If a miscompare is detected by compare logic 15, a signal is transmitted on the error lead to compare watchdog logic 30. The generation of the error signal also causes a failure signal to be generated.

Referring to FIG. 3, a flow diagram of the functional lockstep processing for a write operation is shown. Initially, the comparison logic is in wait state 40. When a write operation is performed, the functional lockstep arrangement detects the write and a transition is made to block 41. Block 41 holds the first processor to issue the write operation. This means that the appropriate processor is told via the wait lead to suspend its processing. Next, block 42 determines whether all the processors have performed the write operation. If all the processors have not yet performed the write operation, block 42 transfers control to block 40 which waits until the write operation has been performed by all the processors. When the first processor performed the write operation, a watchdog timer was initiated. This watchdog timer expires after a predetermined time. This time period is sufficient for all the processors to have performed their write operations. When the watchdog timer expires, it indicates that one or more of the processors have failed to perform the appropriate operation within the predetermined time period. If this occurs, a transition is made from the wait state 40 via the time-out-expired path to block 45. Block 45 performs a shut-down and disables the processors performing a restart and other associated operations, as necessary.

When all the processors have performed the write operation, transfer is made from block 42 to block 43 via the YES path. The comparison logic next determines whether the output of the processors all match or satisfies a particular voting scheme (M of N processors match), block 43. If the processor outputs compare, a transfer is made from block 43 to block 44 via the YES path. Block 44 releases the processors to continue their respective processing and allows the write operation to the appropriate peripheral to take place. Next, block 44 transfers control via the continued path to block 40 where the compare logic again enters the wait state.

If the processor's output does not compare or if the voting scheme is not satisfied (M of N processors match), then block 43 transfers control via the NO path to block 45. Block 45 disables the processors, shuts down the system, restarts or issues other appropriate commands for detection of an error condition.

As can be noted from the above, the functional lockstep approach described has the advantage of synchronous operation of redundant processors without the expense of and complex logic to monitor clock lockstep processors. The functional lockstep approach provides for matching on a particular machine instruction such as a write operation or on a functional group of instructions which perform a write or read operation. This has the advantage that different processors may be used as redundant processors. For example, a Motorola processor of the 68000 family may be used with a processor of the 386 family or non-exact program instructions may be used by these processors and still functionally operate as redundant processors.

Figure 4:
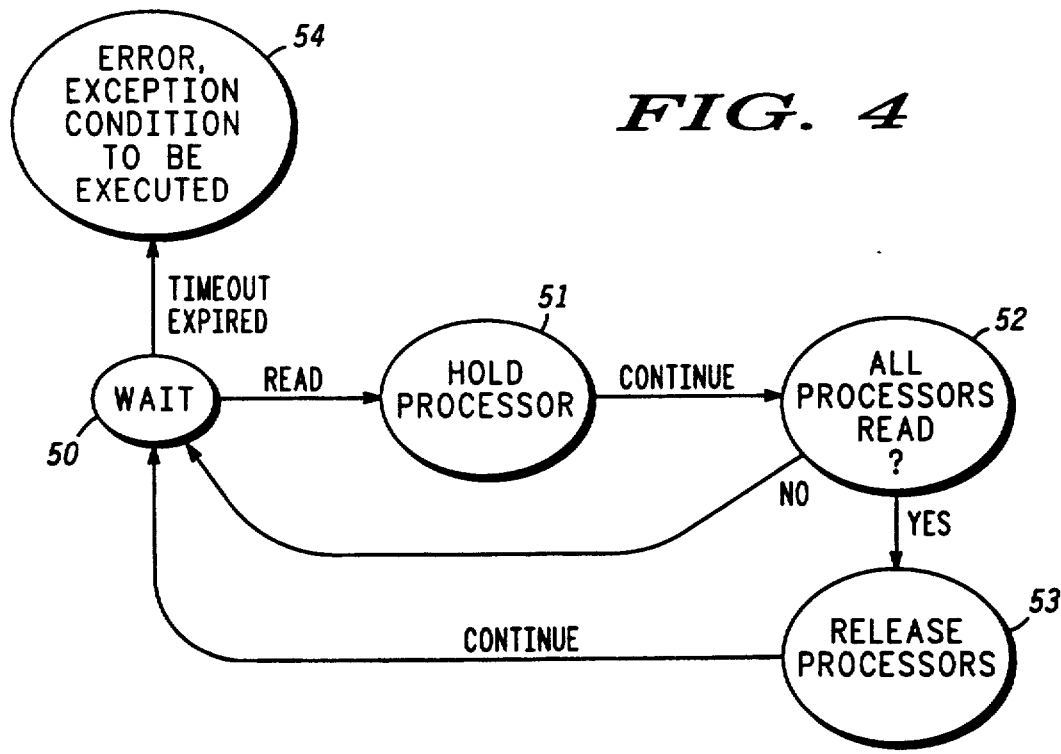
FIG. 4 is a flow diagram of the functional lockstep read operation flow.

FIG. 4 is a flow diagram of a functional lockstep read operation. Initially the comparison logic is in wait state, block 50 although processors are correctly operating. When a read operation occurs, block 50 transfers control to block 51 via the READ path. Block 51 holds the first processor to (?) the read command and transfers control to block 52 via the CONTINUE path. Block 52 determines whether all the processors have performed the read operation. If all the processors have not yet performed the read operation, transfer is made from block 52 to block 50 via the NO path. Block 50 waits until another processor has performed the read operation.

If all the processors have performed the appropriate read operation, block 52 transfers control to block 53. Since multiple processors are attempting to read from a single peripheral, it is important to insure that first of all, each of the processors has issued the appropriate read and second of all, the processors read the same information. Since at this point, each of the processors has been held and all the processors are performing a read operation, all the processors will receive the same data. Block 53 releases the processors and transfers control to block 50 via the CONTINUE path. Block 50 waits until the next functional lockstep operation is issued.

When the read command of the first processor to issue a read is received by the compare logic, a watchdog timer is initiated. This watchdog timer is sufficient in time to allow all the processors to issue their respective read commands. If one or more of the processors has failed to respond within the predetermined watchdog time-out period, then block 50 transfers control to block 54 where an error condition is detected and the error noted and appropriate exception procedures executed. The exception procedures may include shutdown, disabling the procedures, or initiating the system clear in restart.

Further, for systems in which processors are interrupt driven, interrupts received by some of the processors and not others may cause a mismatch of functional read/write lockstep. The interrupt-driven system may also use a functional lockstep approach by implementing further control features such as providing a means of turning off interrupts when read or write operations are about to begin by a processor. Secondly, additional control logic may be added to inhibit the interrupt source from occurring when read or write cycles are being executed. Thirdly, a interrupt service status line may be examined prior to read or write operations to determine whether an interrupt is due.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A functional lockstep arrangement for operating a plurality of redundant processors, said functional lockstep arrangement comprising:

a plurality of redundant processor means;
peripheral device means;
control logic means coupled between said plurality of redundant processor means and said peripheral device means, said control logic means or asynchronously collecting requests by said plurality of redundant processor means for access to said peripheral device means and for determining that said requests are substantially identical to control access to said peripheral device means;
said control logic means including:
a plurality of register means corresponding to said plurality of redundant processor means, one of said plurality of said register means being connected to a corresponding one of said processor means, each said register means for storing information of said corresponding processor means; and
means for suspending the operation of each of said plurality of processor means, said means for suspending including a plurality of connections between said control logic means and each of said plurality of processor means, said means for suspending operating i response to each of said register means to suspend the operation of the processor means corresponding to said register means.

2. A functional lockstep arrangement as claimed in claim 1, wherein said control logic means further includes means for comparing said information transmitted by each of said processor means to each of said corresponding register means to determine whether the information of each of said register means is substantially identical.

3. A functional lockstep arrangement as claimed in claim 2, wherein said means for comparing includes first means for comparing said data information transmitted from each of said processor means to said corresponding register means to determine whether said data information is substantially identical.

4. A functional lockstep arrangement as claimed in claim 2, wherein said means for comparing further includes second means for comparing said address information transmitted by each of said plurality of said processor means to said corresponding register means to determine whether said address information is substantially identical.

5. A functional lockstep arrangement as claimed in claim 2, wherein said control logic means further includes watchdog timer means connected to said means for comparing, said watchdog timer means operating in response to a first of said plurality of processor means requesting access to said peripheral device means to initiate timing of a predetermined time period, said watchdog timer means being disabled when each of said plurality of processor means has requested access to said peripheral device means, if said predetermined time period expires prior to each of said plurality of processor means requesting access to said peripheral device means, said watchdog timer means producing a failure output; said watchdog timer means being further operated in response to said means for comparing to produce said failure output for a miscomparison of said information of each of said register means.

6. A functional lockstep arrangement as claimed in claim 2, wherein said control logic means further includes holding register means connected between said means or comparing, said peripheral device means and at least one of said plurality of register means, said holding register means operating in response to an enable signal of said means for comparing to store and to forward said information of said connected register means to said peripheral device means.

7. A functional lockstep arrangement as claimed in claim 1, wherein said control logic means further includes means for voting comparison connected to each of said plurality of register means, said means for voting comparison for determining whether said information transmitted from said processor means to said corresponding register means of M of N said register means is substantially identical, where N is the number of said register means and M is less than N.

8. A functional lockstep arrangement as claimed i claim 7, wherein said control logic means further includes watchdog timer means connected to said means for voting comparison, said watchdog timer means operating in response to a first of said plurality of processor means requesting access to said peripheral device means to initiate timing of a predetermined time period, said watchdog timer means being disabled when each of said plurality of processor means has requested access to said peripheral device means, if said predetermined time period expires prior to each of said plurality of processor means requesting access to said peripheral device means, said watchdog timer means producing a failure output; said watchdog timer means being further operated in response to said means for voting comparison to produce said failure output for a miscomparison of said information of M of N of said register means.

9. A functional lockstep arrangement as claimed in claim 1, wherein:
said means for suspending includes a plurality of wait leads, each wait lead coupled between said compare logic means and a corresponding one of said plurality of redundant processor means; and
each of said plurality of redundant processor means includes a wait input coupled to a corresponding one of said plurality of wait leads, said wait input for suspending the operation of each of said plurality of redundant processor means.

10. A functional lockstep method for operating a plurality of redundant processors, the functional lockstep method comprising the steps of:
requesting by each of the plurality of processors a data transfer with respect to a peripheral device;
suspending the operation of each of the processors in response to receipt of each processor's request for peripheral device data transfer;
comparing the information transmitted by each of the processors to determine that each of the processors, information is substantially identical; and
releasing each of said suspended processors in response to a determination that the information transmitted by each of the processors is substantially identical.

11. A functional lockstep method as claimed in claim 10, wherein said step of comparing includes the step of determining whether each of the processors of the plurality have requested the data transfer to said peripheral device.

12. A functional lockstep method as claimed in claim 11, wherein the step of suspending includes the step of initiating a timer to time a predetermined interval from the first data transfer request of the processors.

13. A functional lockstep method as claimed in claim 12, wherein the step of comparing further includes the step of stopping the timer in response to the determination that all of the plurality of processors have made the request for data transfer to the peripheral device.

14. A functional lockstep method as claimed in claim 13, wherein said step of comparing further includes the step of first indicating an error in response to a determination that the information transmitted by each of the processors is not substantially identical.

15. A functional lockstep method as claimed in claim 14, wherein there is further included the step of second indicating an error condition in response to the expiration of the predetermined interval prior to each of the processors requesting data transfer to the peripheral device.

16. A functional lockstep method as claimed in claim 10, wherein said step of comparing includes the step of determining that the transmitted information of M processors of the plurality of N processors are substantially identical, where M is less than N.

17. A functional lockstep method as claimed in claim 10, wherein said step of requesting further includes the step of transmitting, by each of the processors, an address to be compared.

18. A functional lockstep method as claimed in claim 10, wherein said step of requesting includes the step of transmitting, by each of the processors, data to be compared.

19. In a redundant processor processing system, a functional lockstep arrangement for synchronously operating a plurality of redundant processors, said functional lockstep arrangement comprising:
a plurality of redundant processor means;
peripheral device means;
means for storing connected to each of said processor means, said means for storing address and data information transmitted asynchronously between said processor means and said peripheral device means;
means for comparing said stored address and data information to determine whether said address and data information of each of said processor means is substantially identical, said means for comparing producing an output to indicate a substantially identical comparison; and
means for transferring the data information between said processor means and the peripheral device means in response to the indication of a substantially identical comparison of said address and said data information.

* * * * *

UNITED STATES PATENT AND TRADEMARK OFFICE
CERTIFICATE OF CORRECTION

PATENT NO. : 5,226,152
DATED : July 6, 1993
INVENTOR(S) : Keith M. Klug et al.

It is certified that error appears in the above-indentified patent and that said Letters Patent is hereby corrected as shown below:

Column 6, line 16, claim 1, change "i" to --in--.

Column 7, line 7, claim 8, change "i" to --in--.

Signed and Sealed this

Thirty-first Day of May, 1994

Attest:

BRUCE LEHMAN

*Attesting Officer*         *Commissioner of Patents and Trademarks*